United States Patent
Ban et al.

(10) Patent No.: US 7,526,121 B2
(45) Date of Patent: Apr. 28, 2009

(54) THREE-DIMENSIONAL VISUAL SENSOR

(75) Inventors: Kazunori Ban, Yamanashi (JP); Ichiro Kanno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 800 days.

(21) Appl. No.: 10/689,721

(22) Filed: Oct. 22, 2003

(65) Prior Publication Data
US 2004/0080758 A1 Apr. 29, 2004

(30) Foreign Application Priority Data
Oct. 23, 2002 (JP) ............................. 2002-308451

(51) Int. Cl.
*G06K 9/00* (2006.01)
(52) U.S. Cl. ..................................... 382/154
(58) Field of Classification Search ................. 382/153
See application file for complete search history.

(56) References Cited

U.S. PATENT DOCUMENTS

| | | | |
|---|---|---|---|
| 4,017,721 A | | 4/1977 | Michaud |
| 5,129,010 A | * | 7/1992 | Higuchi et al. ............... 382/154 |
| 5,280,542 A | * | 1/1994 | Ozeki et al. .................. 382/154 |
| 5,317,388 A | | 5/1994 | Surka et al. |
| 5,699,444 A | * | 12/1997 | Palm ........................... 382/106 |
| 5,917,940 A | * | 6/1999 | Okajima et al. ............. 382/173 |
| 6,101,268 A | * | 8/2000 | Gilliland ..................... 382/152 |
| 6,137,902 A | * | 10/2000 | Kinoshita et al. ........... 382/154 |
| 6,415,051 B1 | * | 7/2002 | Callari et al. ............... 382/154 |
| 2002/0097906 A1 | * | 7/2002 | Ishiyama ..................... 382/154 |
| 2004/0005092 A1 | * | 1/2004 | Tomasi ........................ 382/154 |

FOREIGN PATENT DOCUMENTS

| | | |
|---|---|---|
| DE | 1215017 A | 6/2002 |
| JP | 60-183509 | 9/1985 |
| JP | 07-098208 | 4/1995 |
| JP | 08-110807 | 4/1996 |
| JP | 2002-090113 | 3/2002 |

OTHER PUBLICATIONS

Notice of Reasons for Rejection dated Oct. 28, 2004.
European Search report dated, Apr. 13, 2007 issued in correspondence with European Patent Application No. 03256629.

* cited by examiner

*Primary Examiner*—Matthew C Bella
*Assistant Examiner*—Alex Liew
(74) *Attorney, Agent, or Firm*—Staas & Halsey LLP

(57) ABSTRACT

Slit light is projected onto the surface of an object, the reflected light is received using a video camera and analyzed by means of an image processor to thereby determine an equation of the surface onto which the slit light is projected. Then, an image is captured through normal image taking using the video camera and a straight line (line of sight) passing through the measuring point on the object and the center of the video camera is determined. Furthermore, parameters such as an affine transformation are determined by a comparison between the image of a characteristic area F of the object and a reference image. Then, the three-dimensional position and posture of the measuring point are determined from an intersection between the line of sight and the determined surface.

18 Claims, 6 Drawing Sheets

THREE-DIMENSIONAL VISUAL SENSOR

BACKGROUND OF THE INVENTION

1. Field of the Invention

The present invention relates to a three-dimensional visual sensor which acquires three-dimensional information on an object and applies to, for example, a three-dimensional visual sensor used for three-dimensional measurement of assembly parts, etc.

2. Description of the Related Art

Conventionally, a three-dimensional visual sensor provided with a projector and a light receiver is widely known. This conventional type three-dimensional visual sensor carries out three-dimensional measurement of an object using only three-dimensional information obtained from reflected light of pattern light (slit light, spotlight, etc.) projected onto the object. However, such an information acquisition system has problems as follows:

(1) Pattern light must always be irradiated precisely onto a part to be measured on the object. Furthermore, even when the object has a flat surface, the inclination of the surface can be calculated, whereas the position is unknown.
(2) It is only information on the projected part that can be acquired and information acquired as features is quite limited such as end points of a line, and therefore this system is likely to lack quality in aspects of noise robustness and accuracy.

As described in Japanese Patent Application Laid-Open No. 60-183509, there is an attempt to perform surface measurement by determining contours of an object in a two-dimensional image and an intersection of slit light. However, even this technique cannot solve the above-described problem (1) and requires post-processing to improve the accuracy, which takes an extra processing time. Furthermore, with respect to the above-described problem (2), when noise occurs in the intersection, the problem cannot be said to be solved by the technique of the above-described patent document.

SUMMARY OF THE INVENTION

It is an object of the present invention to provide a three-dimensional visual sensor that uses a light receiver which is originally provided for a type of three-dimensional visual sensor having a projector and light receiver as a two-dimensional visual sensor, too, and combines its result with the three-dimensional measurement result of the conventional three-dimensional visual sensor, and can thereby obtain three-dimensional information on an area to be originally measured even when the pattern light is not irradiated onto the area if pattern light is irradiated onto at least an area whose relationship with the area in question is known (e.g., an area on the same surface or a surface which has a certain relationship with that surface).

The present invention solves the above-described problem by providing a three-dimensional visual sensor using not only three-dimensional information obtained from reflected light such as slit light but also two-dimensional information obtained when the light receiver is singly used. More specifically, the three-dimensional visual sensor for acquiring three-dimensional information of an object according to the present invention comprises two-dimensional information acquiring means, three-dimensional information acquiring means and information combining means.

Then, according to a first embodiment of the present invention:

(A1) The two-dimensional information acquiring means determines the position of a measuring point of an object on a two-dimensional image including the object captured by a camera, compares a reference image including a characteristic area of the object with the image of the characteristic area in the two-dimensional image and determines parameter values that describe a transformation expressing geometrical deformation to the reference image provided by mapping using the camera.

Here, it is possible to use, for example, an affine transformation as this transformation and determine parameter values that describe the affine transformation. It is also possible to use a perspective transformation which is equivalent to an affine transformation defined more strictly and determine parameter values for describing the perspective transformation. It is a known fact that these geometrical deformations provided by mapping using the camera are expressed through an affine transformation or perspective transformation or these transformations are described with a predetermined number of parameters.

(B1) The three-dimensional information acquiring means receives the reflected light of the light projected by the projecting means onto the object by means of the light receiving means to acquire three-dimensional information on the inclination of the surface on which the measuring point of the object exists and/or distance from the camera to the surface. Furthermore, (C1) the information combining means combines the information acquired by the two-dimensional information acquiring means and the information acquired by the three-dimensional information acquiring means based on the calibration information of the camera and generates new three-dimensional information.

Here, the information combining means may also comprise means for determining a straight line in a three-dimensional space which passes through the measuring point on the object and a specific point on the camera and means for determining an intersection between the above described surface and straight line based on the information on the straight line and the surface on which the measuring point on the object exists.

Furthermore, according to a second embodiment of the present invention:

(A2) The two-dimensional information acquiring means is the same as that used in the first embodiment.

(B2) The three-dimensional information acquiring means receives the reflected light of the light projected by the projecting means onto the object by means of the light receiving means to acquire three-dimensional information on the inclination of the first surface which has a certain positional relationship with the measuring point on the object and/or distance from the camera to the surface. Furthermore, (C2) the information combining means combines the information acquired by the two-dimensional information acquiring means and the information acquired by the three-dimensional information acquiring means based on the calibration information of the camera and generates new three-dimensional information. Then, the information combining means further comprises means for determining a straight line in a three-dimensional space which passes through the measuring point on the object and a specific point on the camera, means for determining information on a virtual second surface which has a certain positional relationship with the first surface and passes through the measuring point on the object from the information on the first surface and means for determining an intersection between the above described straight line and the above described second surface.

In both the first embodiment and the second embodiment, light may also be received at the same camera position at which the two-dimensional image has been captured. The camera may serve also as light receiving means.

Furthermore, when the camera serves also as light receiving means, it is also possible to mount the camera in a robot and provide means for acquiring the two-dimensional information and the three-dimensional information at the same robot position and transforming means for transforming the information acquired by the information combining means into information expressed on the coordinate system of the robot.

Furthermore, this transforming means may also be adapted so as to acquire the positional information of the robot from the robot and transform the result obtained by the information combining means into information expressed on the coordinate system on the robot. Furthermore, it is also possible to provide transforming means on the robot and transfer the result obtained by the information combining means to the robot.

In short, the three-dimensional sensor according to the present invention comprises:

pattern light projecting means for projecting slit light or spot light onto the surface of an object;

a camera that captures a two-dimensional image of the object;

means for determining a straight line which passes through a measuring point on the object and a specific point on the camera from the image of the object captured by the camera;

means for causing the camera to capture the slit light or spot light projected by the pattern light projecting means onto the surface of the object and determining the surface of the object on which the measuring point exists;

means for determining the three-dimensional position of the measuring point from the straight line determined by the means for determining a straight line and the surface determined by the means for determining a surface; and means for calculating an amount of rotation of the object around the measuring point on the plane including the surface of the object by comparing the shape of the image of the entire object or part of the object captured by the camera with a prepared reference shape of the entire object or part of the object.

"new three-dimensional information" referred to in the above (C1) and (C2) may contain the three-dimensional position and inclination of the plane including the measuring point representing the shape of a workpiece and an amount of rotation (or phase) of the object around the measuring point on the plane including the surface of the object.

BRIEF DESCRIPTION OF THE DRAWINGS

The foregoing and other objects, features and advantages of the invention will become more apparent from the following description of embodiments of the invention with reference to the drawings:

FIGS. 5(a) and 5(b) illustrate parameters describing an affine transformation, wherein FIG. 5(a) shows a reference image and FIG. 5(b) shows parameters describing the affine transformation along with the two-dimensional image acquired during a measurement;

DESCRIPTION OF THE EMBODIMENTS

Figure 1:
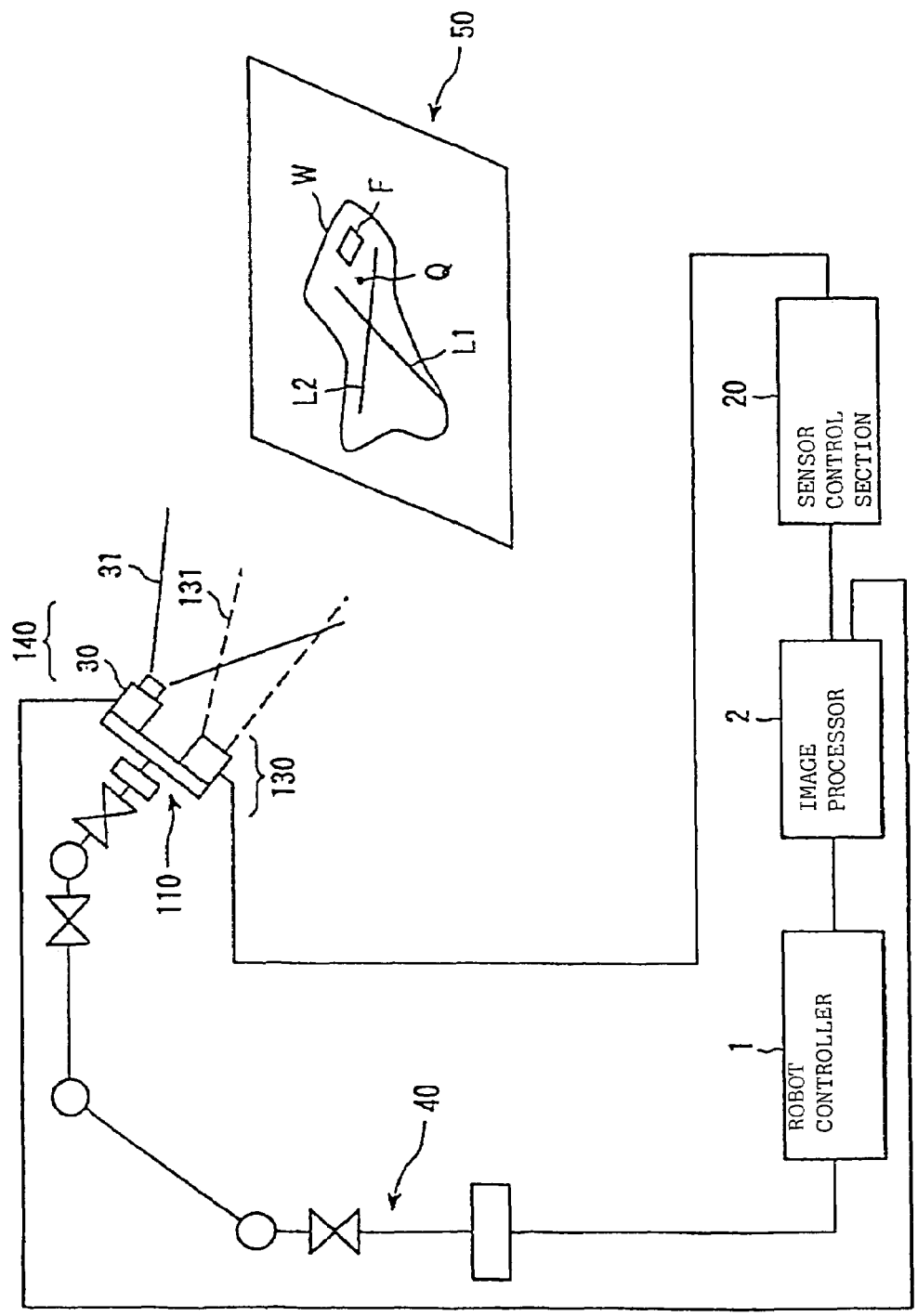
FIG. 1 illustrates an outline of an overall arrangement of a system using a three-dimensional visual sensor according to one embodiment of the present invention.

FIG. 1 illustrates an outline of an overall arrangement of a system using a three-dimensional visual sensor according to one embodiment of the present invention. As shown in FIG. 1, the overall system comprises a robot (body) 40, a robot controller 1, an image processor 2, a sensor body section 110 and a sensor control section 20. The sensor body section 110 comprises a projector 130 and a light receiver 30 mounted on the distal end of the hand of the robot 40. The projector 130 is a publicly known one that projects slit light 131 onto the surface of an object (e.g., workpiece such as assembly part) W placed in a work space 50 and the reflected light thereof is received by the light receiver 30.

Here, a video camera is used as the light receiver 30. The video camera 30 has a sufficient field of vision 31 and is used not only to receive reflected light when the slit light is projected but also to acquire a two-dimensional image including the image of the object W by normal image taking (without projection of slit light). The image processor 2 analyzes the image of the reflected light of the slit light 131 when the slit light is projected and acquires the inclination and distance from the video camera 30, etc., as three-dimensional information of the surface onto which the slit light 131 is projected. Furthermore, during normal image taking, the image processor 2 obtains information on the position of a desired point (hereinafter referred to as "measuring point") Q on the two-dimensional image to be measured and the posture of the object W (details will be described later).

Suppose that a plurality of parameters (hereinafter referred to as "calibration data") included in a transformation expression for determining a straight line (hereinafter also referred to as "line of sight") passing through a two-dimensional position (u, v) and the center of the lens (specific point on the video camera 30) has been determined in advance from the position (u, v) of any pixel on the pixel plane of the video camera 30 through calibration, and stored in a memory in the image processor 2. Various ways of carrying out calibrations and various ways of determining calibration data are known and any of them can be used, and so details thereof will be omitted here.

Furthermore, data indicating a positional relationship between the position (u, v) on the image and position on the three-dimensional coordinate system (appropriately set work coordinate system) and data on the coordinate system (robot coordinate system) set on the robot are also stored in the memory in the image processor 2. Therefore, the two-dimensional or three-dimensional information obtained from the image processor 2 is allowed to be transformed (converted) into data on the robot coordinate system in the robot controller 1 or the image processor 2 using the current position data of the robot 40. Calculations for transforming (converting) data obtained through the three-dimensional visual sensor into data on the robot coordinate system are publicly known, and so details thereof will be omitted.

For simplicity of explanation, the object W as the example shown in FIG. 1 is a workpiece having a flat surface and FIG. 1 shows a state in which the slit light 131 is projected onto the surface of the workpiece and emission lines L1 and L2 are formed. Furthermore, reference character Q denotes a measuring point on the surface of the workpiece W. Reference character F denotes a characteristic area of the workpiece W and here it is assumed to have a rectangular contour. As the measuring point Q, a point that can be extracted as a characteristic point from a two-dimensional image obtained from normal image taking is selected. In that sense, the measuring point Q is a "characteristic point."

Figure 2:
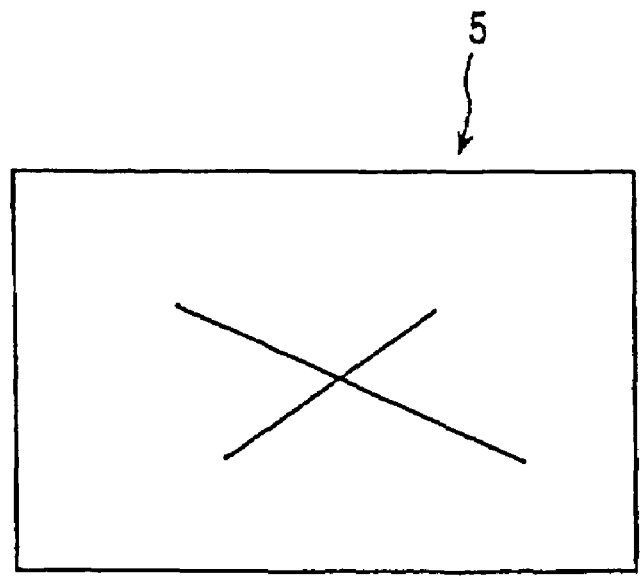
FIG. 2 illustrates an example of an image where a slit light image (emission line) appears.

The slit light 131 is projected only when three-dimensional information is acquired. At this time, as shown in FIG. 2, an image 5 where slit light image (emission lines) appears is obtained from the video camera 30. The two-dimensional position of each pixel corresponding to the slit light image (emission lines) extracted from this image 5 can be transformed into data expressing a three-dimensional position by referencing the above described calibration data. By acquiring many such three-dimensional positions, an equation which describes the plane 7 of the workpiece W can be obtained.

Figure 3:
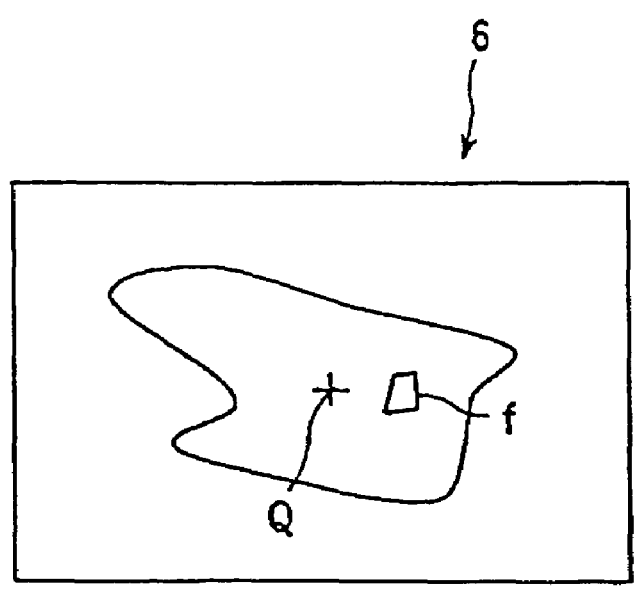
FIG. 3 illustrates an example of a two-dimensional image acquired by normal image taking.
Figure 4:
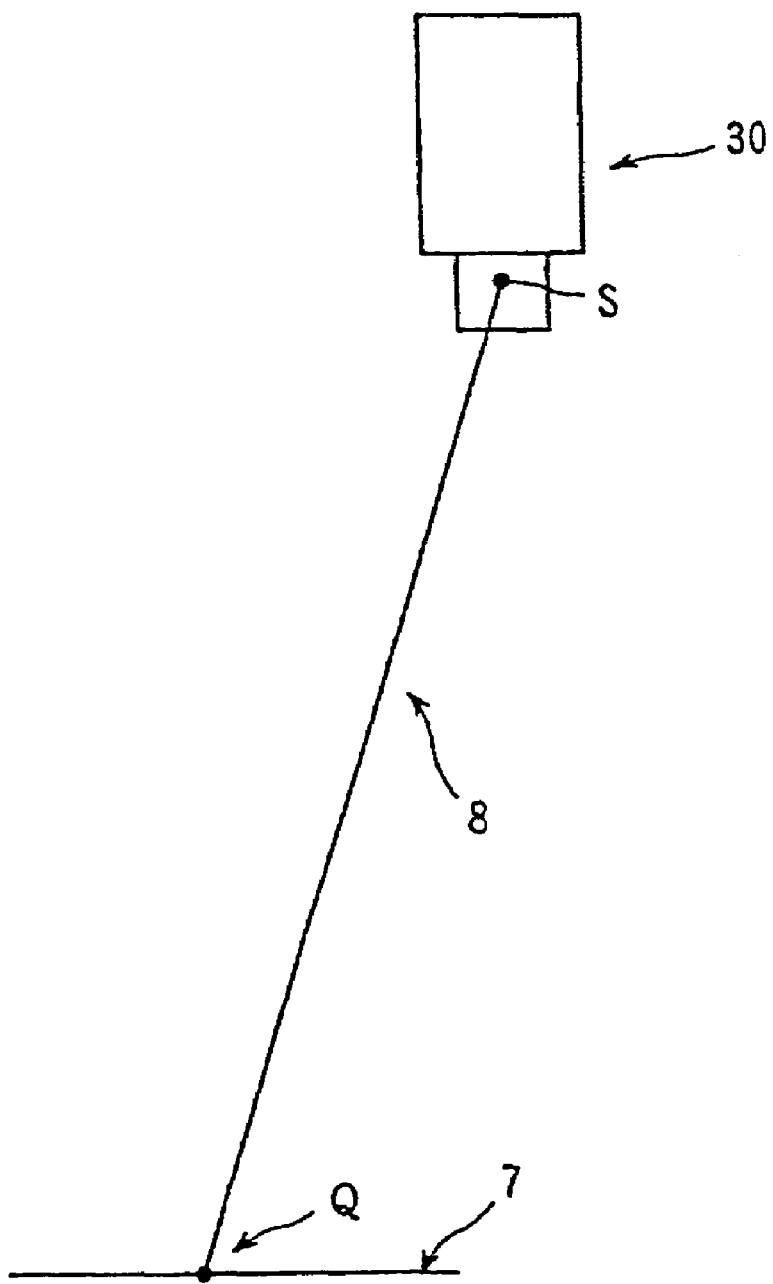
FIG. 4 illustrates a line of sight of a measuring point Q.

On the other hand, when two-dimensional information is acquired, an image 6 where the contour of the workpiece W appears is acquired by normal image taking as shown in FIG. 3. From the two-dimensional image 6 obtained by normal image taking, the coordinate values (uq, vq) of the measuring point Q on the pixel plane is calculated through two-dimensional image processing. Then, based on the coordinate values (uq, vq) of this measuring point Q and the above described calibration data, an equation of a three-dimensional straight line 8 which passes through the measuring point Q and the lens center S of the video camera 30 (specific point on the video camera) as shown in FIG. 4 can be obtained.

Furthermore, from the two-dimensional image 6 obtained through normal image taking, "parameters describing a transformation expressing a geometrical deformation with respect to a reference image provided by mapping using the camera" are obtained as data containing information on the rotation position of the workpiece W. These are the parameters to describe the content of a transformation when a relationship of geometrical deformation between an image f of the characteristic area F of the two-dimensional image 6 obtained during an arbitrary measurement and a reference image f0 of the same workpiece which has been acquired beforehand through normal image taking is expressed with a transformation relationship which approximately expresses the mapping using the camera.

As the characteristic area F, an area which can be extracted as the image f of the characteristic area is selected from the two-dimensional image obtained through normal image taking. The contour of the entire workpiece W may also be adopted as the characteristic area F.

Figure 5:
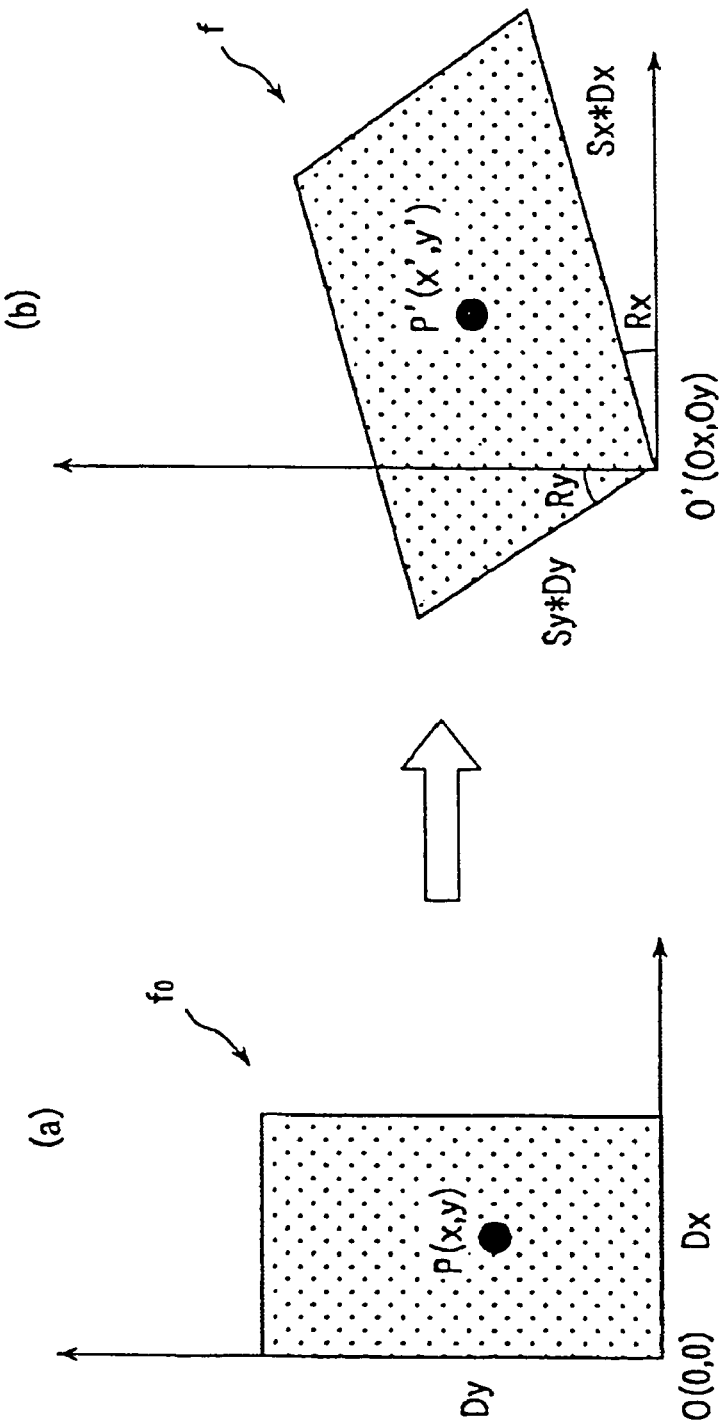

Here, such a transformation will be explained with reference to FIG. 5(a) and FIG. 5(b) using an affine transformation as an example. FIG. 5(a) shows the reference image f0 of the characteristic area F. The reference image f0 is acquired by taking an image of the workpiece W from right above under a condition such that the image of the rectangular characteristic area F becomes a rectangular image. However, such a condition is only an example for simplifying the calculation and it is not intended to limit the present invention. Generally, the reference image can be captured from any image taking direction.

FIG. 5(b) shows the image f of the characteristic area F extracted from the image 6 of the workpiece W. This image f can be approximately handled as an image obtained by applying an affine transformation to the reference image f0 shown in FIG. 5(a).

In the case of this example, the content of the affine transformation can be described with six parameters Ox, Oy, Sx, Sy, Rx and Ry. Here, Ox and Oy are parameters which indicate the point on the image which corresponds to the origin O (0, 0) of an orthogonal coordinate system arbitrarily defined with respect to the reference image f0, wherein Ox denotes the x component of translation and Oy denotes the y component of translation. Furthermore, as shown in the figure, Sx and Sy denote expansion ratios of the sides, having length of Dx and Dy, of the reference image f0, respectively, and Rx and Ry denote amounts of rotation of the sides, having length of Dx and Dy, on the image respectively. A point P (x, y) denotes a point on the reference image and a point P' (x', y') denotes the corresponding point after the affine transformation. (x', y') are the coordinate values expressed on the coordinate system O (FIG. 5(a)) and there is a relationship between (x, y) and (x', y') as shown in the figure.

The image f extracted from the two-dimensional image acquired through normal image taking is analyzed by the image processor 2 and these parameters Ox, Oy, Sx, Sy, Rx and Ry are determined. The processing method of determining those values is publicly known, and so detailed explanations thereof will be omitted. Furthermore, as a transformation other than affine transformation, it is also possible to use a perspective transformation equivalent to an affine transformation defined more strictly and determine the values of parameters that describe the perspective transformation. As described above, expressions of geometrical deformations provided by mapping using the camera through an affine transformation or perspective transformation and description of those transformations using a predetermined number of parameters are publicly known, and so detailed explanations of the perspective transformation, etc., will be omitted.

In this way, through normal image taking, the pixel position of the measuring point Q (uq, vq) and affine transformation parameters are obtained as two-dimensional information and further the straight line (line of sight) 8 which passes through the pixel position (uq, vq) of the measuring point Q and the lens center S (specific point of the video camera 30) is determined from the pixel position (uq, vq) and calibration data. On the other hand, the plane 7 of the workpiece W (equation of the plane) is determined as three-dimensional information from the measurement using the slit light. From the equation, it is also possible to calculate the inclination of the plane and distance from the specific point on the camera, etc.

Then, it is possible to combine the two-dimensional information and three-dimensional information and determine the position and posture of the workpiece W represented by the position and posture of the intersection (measuring point) Q between the plane 7 of the workpiece W and straight line (line of sight) 8.

Figure 6:
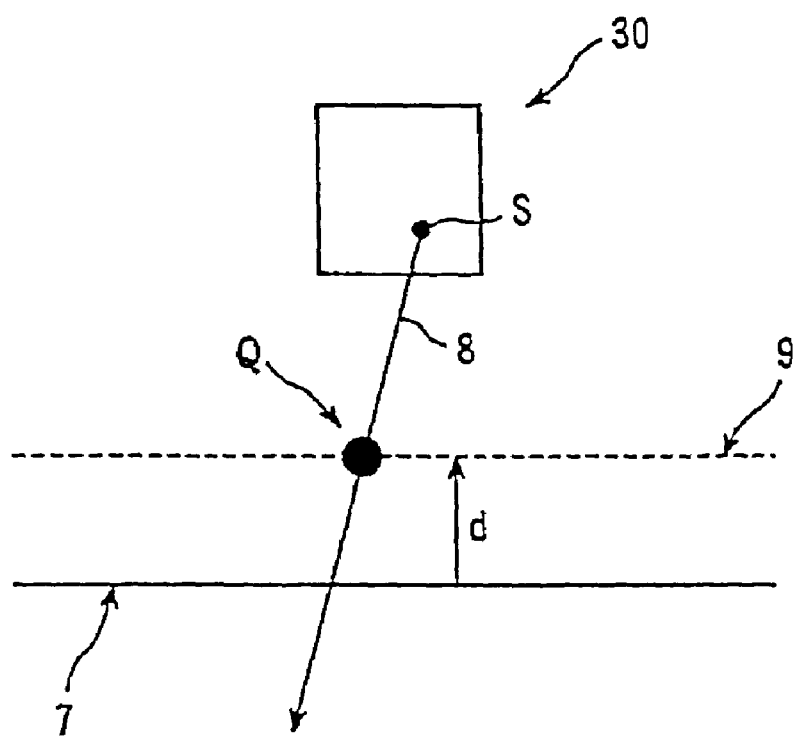
FIG. 6 illustrates a method of determining the position and posture of a measuring point when the measuring point is not on the surface irradiated with slit light.

When the measuring point Q is not located on the plane 7, as shown in FIG. 6, it is possible to determine the accurate position by setting a distance d between the plane (virtual plane) 9 on which the measuring point Q is located and the plane 7 beforehand.

Here, the object (workpiece) W is assumed to have a flat surface, but the shape is not particularly limited and any shape is acceptable if it can be estimated from the three-dimensional information. The shape can be cylindrical or spherical, for example. For example, if the measuring point Q is a point on a cylindrical plane, it is possible to determine an equation of the cylindrical plane through projection of slit light, determine an intersection between the cylindrical plane and the line of sight 8 that passes through the measuring point Q and thereby determine the three-dimensional position and posture of the measuring point Q on the cylindrical plane.

Likewise, if the measuring point Q is a point on a spherical plane, it is possible to determine an equation of the spherical plane through projection of slit light, determine an intersection between the spherical plane and the line of sight 8 and thereby determine the three-dimensional position and posture of the measuring point Q on the spherical plane. Furthermore, when the measuring point Q is not located on the cylindrical plane or the spherical plane, if a distance from a virtual cylindrical plane or spherical plane which is parallel to the cylindrical plane or spherical plane and passes through the measuring point Q is set, then the three-dimensional position and posture of the measuring point Q can be determined through the same handling as that in the case of the flat surface.

Figure 7:
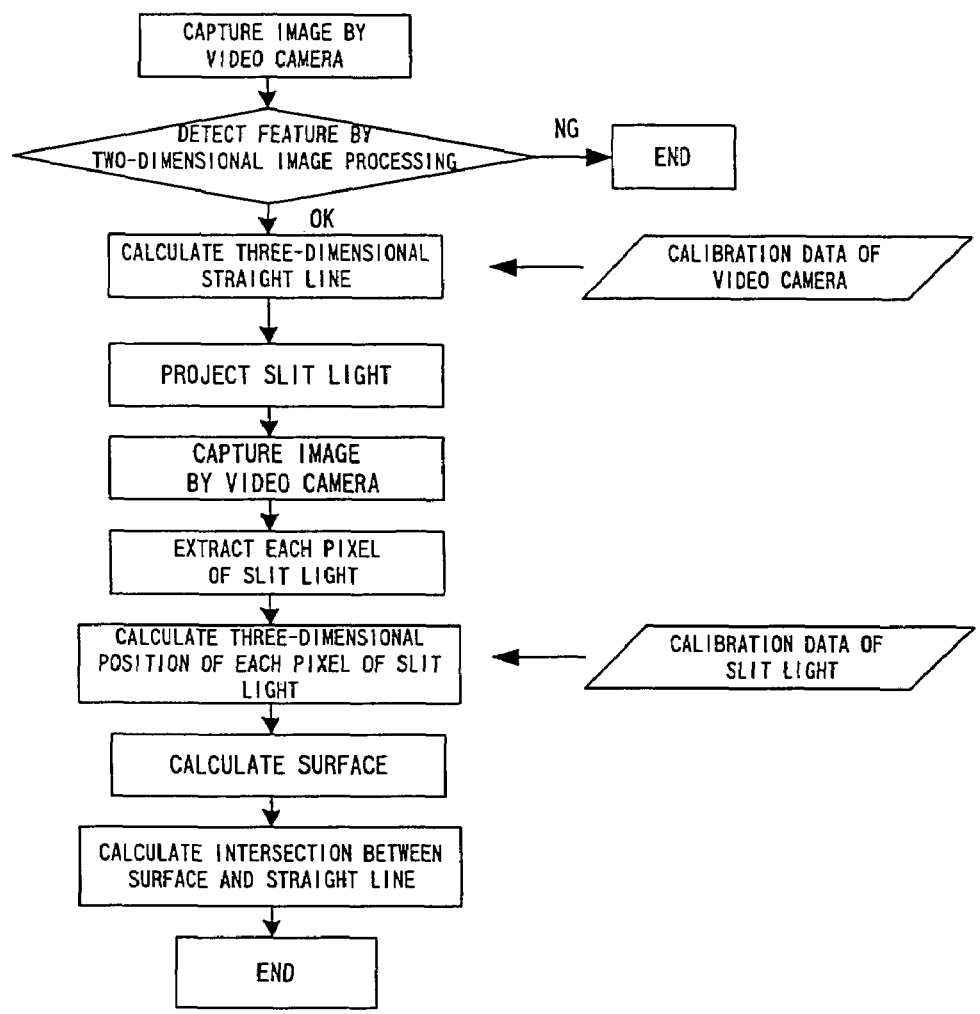
FIG. 7 is a flowchart showing an overview of a measurement procedure using the three-dimensional visual sensor according to this embodiment.

FIG. 7 is a flow chart showing an outline of the procedure for performing the above described measurement. Execution commands in respective steps are output from the robot controller 1 and transmitted to the sensor control section 20 or the image processor 2.

As shown in the flow chart, a two-dimensional image is captured through normal image taking without the slit light first. The image processor 2 finds the measuring (characteristic) point Q from the obtained two-dimensional image (see FIG. 3). When the characteristic point is found, the image processor 2 calculates the three-dimensional straight line 8 that passes through the measuring point Q using the calibration data of the video camera 30 and stores it in the memory of the image processor 2. If no characteristic point is found, the processing is stopped here.

Then, the two-dimensional image f (see FIG. 3) of the characteristic area F of the workpiece is extracted. Then, as described above, the image f is compared with the reference image f0, values of affine transformation parameters are obtained and stored in the memory of the image processor 2. In the case where the two-dimensional image (see FIG. 3) and the image f (see FIG. 5) of the characteristic area F cannot be extracted, the processing is stopped here.

Then, an image (see FIG. 2) is captured with the slit light being projected without moving the robot 40, the pixels of the slit light are extracted from the image and the three-dimensional positions are determined with regard to the respective pixels. From the aggregation of three-dimensional positions, the equation of the plane is determined, and from this plane and the straight line 8 obtained above, the three-dimensional position and posture of the measuring point Q are determined. As described above, when the measuring point Q is not located on the surface irradiated with the slit light, the distance from the plane (virtual plane) on which the measuring point Q is located is set beforehand and it is thereby possible to determine the three-dimensional position and posture of the measuring point Q using the same procedure.

The data of the three-dimensional position and posture of the measuring point Q determined in this way is stored in the memory in the image processor 2 and the current position data of the robot 40 is received from the robot controller 1, transformed (converted) into data on the robot coordinate system and transmitted to the robot controller 1. This transformation (conversion) can also be calculated by the robot controller 1.

As described above, according to the present invention, the slit light need not always be irradiated so as to pass through the measuring point Q, and therefore it has excellent operability even when there is a large variation in the position of the object. Moreover, even if a portion of the area irradiated with the slit light is disconnected due to some noise, the three-dimensional information of the plane can be easily acquired from data at a plurality of points of the remaining area. Such a feature could hardly be expected from the prior arts.

In the above described embodiment, the type of projector that projects slit light is used, but as is apparent from the whole explanation above, any type of projector can be used as far as it provides three-dimensional information of the plane. Therefore, it goes without saying that it is also possible to use a type of projector which projects spot light as the projector to construct a three-dimensional visual sensor.

Moreover, the above described embodiment uses the light receiver for receiving reflected light of the projected slit light (spot light in some case) which also serves as the video camera for normal image taking, but it is also possible to use a light receiver (e.g., a position detection type photo-detector) different from the video camera for normal image taking.

Even when pattern light is not irradiated onto the area which has to be originally measured, the present invention combines with the three-dimensional measurement result of the visual sensor, and can thereby obtain three-dimensional information on the area which has to be originally measured as far as the pattern light is irradiated onto an area whose relationship with the aforesaid area to be measured is known.

Furthermore, this also improves the operability of the three-dimensional visual sensor and widens the scope of application of the three-dimensional visual sensor.

Moreover, since the two-dimensional information has a much greater amount of information than the three-dimensional information obtained from the reflected light of the pattern light, the present invention can improve robustness against noise and accuracy.

The invention claimed is:

1. A three-dimensional sensor comprising:
   pattern light projecting unit for projecting a slit light or a spot light onto a surface of an object;
   a camera that captures images of the object, including a first image when the projecting unit does not project the slit light or the spot light onto the surface of the object, and a second image when the projecting unit projects the slit light or the spot light onto the surface of the object;
   a unit determining a straight line which passes through a measuring point on the object and a specific point on said camera from the first image of the object captured by said camera;
   a unit determining the surface of the object which includes said measuring point using the second image;
   a unit determining a three-dimensional position of said measuring point from the straight line determined by said unit for determining a straight line and the surface determined by said unit for determining the surface; and
   a unit calculating an amount of rotation of the object around said measuring point on a plane including said surface of the object by comparing a shape of the entire object or part of the object in the first image captured by said camera, with a prepared reference shape of the entire object or part of the object.

2. A three-dimensional visual sensor which performs a three-dimensional measurement of an object, comprising:
   a two-dimensional information acquiring unit;
   a three-dimensional information acquiring unit; and
   an information combining unit, wherein:
   said two-dimensional information acquiring unit determines a position of a measuring point of said object on a two-dimensional image including said object captured by a camera, compares a reference image including a characteristic area of the object with an image of said characteristic area in said two-dimensional image and determines parameter values that describe a transformation expressing geometrical deformation with respect to said reference image provided by mapping using said camera, said three-dimensional information acquiring unit receives a reflected light of a light projected by projecting unit onto said object by unit of light receiving unit to acquire three-dimensional information on an inclination of a surface on which said measuring point of said object exists and/or a distance from said camera to the surface, and said information combining unit combines information acquired by said two-dimensional information acquiring unit and information acquired by said three-dimensional information acquiring unit based on calibration information of said camera and generates new three-dimensional information, by determining, in the three-dimensional space, a straight line which passes through the measuring point on said object and a specific point on said camera, and determining an intersection between said surface and said straight line based on information on said straight line and the surface on which the measuring point on said object exists.

3. The three-dimensional visual sensor according to claim 2, wherein said reflected light is received at a position of the light receiving unit which is the same as a position of the camera at which said two-dimensional image is captured.

4. The three-dimensional visual sensor according to claim 2, wherein said camera also serves as said light receiving unit.

5. The three-dimensional visual sensor according to claim 4, wherein said camera is mounted in a robot, and captures said two-dimensional information and said three-dimensional information at a same robot position, and the three dimensional visual sensor further comprises transforming unit for transforming the new three-dimensional information generated by said information combining unit into information expressed in a coordinate system of said robot.

6. The three-dimensional visual sensor according to claim 5, wherein said transforming unit acquires position information of said robot from said robot.

7. The three-dimensional visual sensor according to claim 5, wherein said transforming unit is provided on said robot and the new three-dimensional information generated by said information combining unit is transferred to said robot.

8. The three-dimensional visual sensor according to claim 2, wherein said information combining unit comprises:
   means for determining, in the three-dimensional space, the straight line which passes through the measuring point on said object and the specific point on said camera; and
   means for determining, based on information on said straight line and the surface on which the measuring point on said object exists, the intersection between said surface and said straight line.

9. A three-dimensional visual sensor which performs three-dimensional measurement of an object, comprising:
   a two-dimensional information acquiring unit that determines a position of a measuring point of said object on a two-dimensional image including said object captured by a camera, compares a reference image including a characteristic area of said object with an image of said characteristic area in said two-dimensional image, and determines parameter values that describe a transformation expressing geometrical deformation with respect to said reference image provided by mapping using said camera;
   a three-dimensional information acquiring unit that receives a reflected light of a light projected by projecting unit onto said object, by unit of light receiving unit, to acquire three-dimensional information on an inclination of a first surface which has a certain positional relationship with said measuring point on said object and/or a distance from said camera to the surface;
   an information combining unit that combines information acquired by said two-dimensional information acquiring unit and the three-dimensional information acquired by said three-dimensional information acquiring unit based on calibration information of said camera, and generates new three-dimensional information;
   a unit for determining a straight line in a three-dimensional space which passes through the measuring point on said object and a specific point on said camera;
   a unit for determining, from the information on said first surface, information on a virtual second surface which has a certain positional relationship with said first surface and passes through the measuring point on said object; and
   a unit for determining an intersection between said straight line and said second surface.

10. The three-dimensional visual sensor according to claim 9, wherein said reflected light is received at a position of the light receiving unit which is the same as a position of the camera at which said two-dimensional image is captured.

11. The three-dimensional visual sensor according to claim 9, wherein said camera also serves as said light receiving unit.

12. The three-dimensional visual sensor according to claim 10, wherein said camera is mounted on a robot and captures said two-dimensional information and said three-dimensional information at a same robot position, and the three-dimensional visual sensor further comprises transforming unit for transforming the new three-dimensional information generated by said information combining unit into information expressed in a coordinate system of said robot.

13. The three-dimensional visual sensor according to claim 12, wherein said transforming unit acquires position information of said robot from said robot.

14. The three-dimensional visual sensor according to claim 12, wherein said transforming unit is provided on said robot and the new three-dimensional information generated by said information combining unit is transferred to said robot.

15. The three-dimensional visual sensor according to claim 2, wherein said transformation is an affine transformation.

16. The three-dimensional visual sensor according to claim 2, wherein said transformation is a perspective transformation.

17. The three-dimensional visual sensor according to claim 9, wherein said transformation is an affine transformation.

18. The three-dimensional visual sensor according to claim 9, wherein said transformation is a perspective transformation.

* * * * *

UNITED STATES PATENT AND TRADEMARK OFFICE
CERTIFICATE OF CORRECTION

PATENT NO. : 7,526,121 B2
APPLICATION NO. : 10/689721
DATED : April 28, 2009
INVENTOR(S) : Kazunori Ban et al.

It is certified that error appears in the above-identified patent and that said Letters Patent is hereby corrected as shown below:

Column 1, Line 17, change "spotlight," to --spot light,--.

Column 5, Line 33, change "from.the" to --from the--.

Column 9, Lines 33-34, change "three dimensional" to --three-dimensional--.

Signed and Sealed this

Eighth Day of September, 2009

David J. Kappos
*Director of the United States Patent and Trademark Office*